June 5, 1951  H. D. BISHNER  2,555,630
BATTERY CHARGER AND POWER INVERTER SYSTEM
Filed May 28, 1948
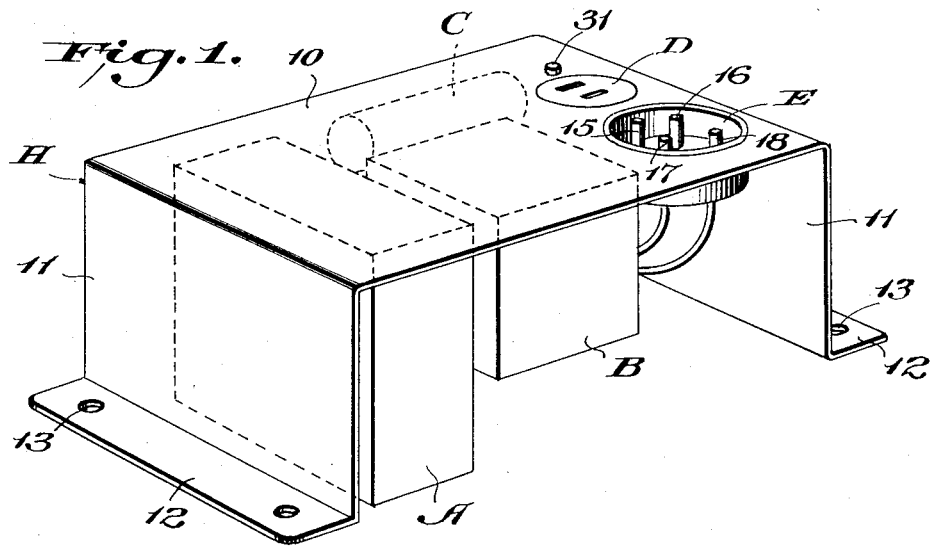
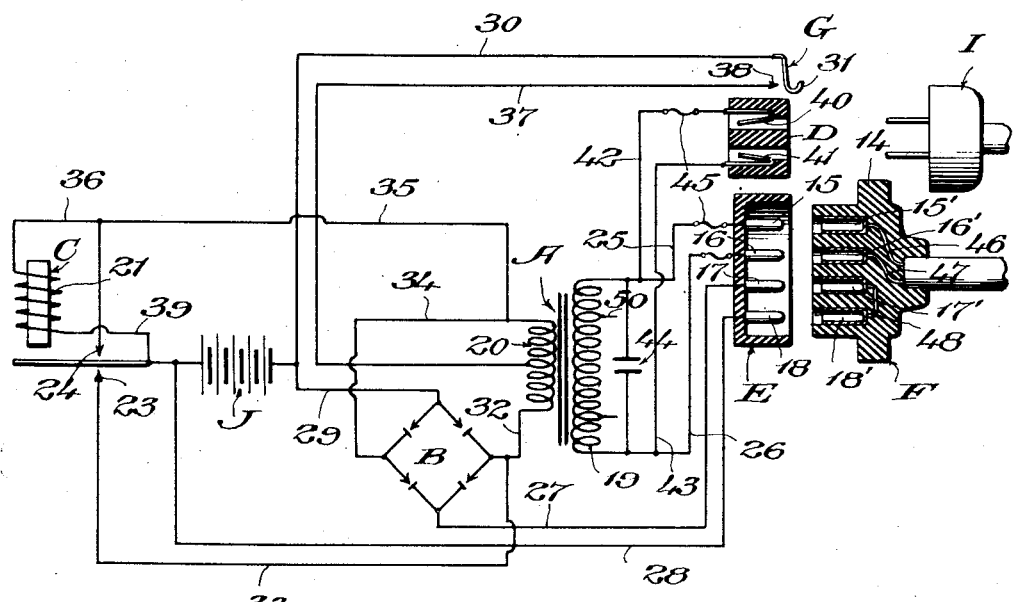
INVENTOR.
Henry D. Bishner,
BY
William I. Deile
ATTORNEY Patented June 5, 1951

2,555,630

UNITED STATES PATENT OFFICE 2,555,630

BATTERY CHARGER AND POWER INVERTER SYSTEM

Henry D. Bishner, Pittsburgh, Pa.

Application May 28, 1948, Serial No. 29,856

9 Claims. (Cl. 171—97)

This invention relates to an electrical system and apparatus, and has for its general object to provide a simple, practical battery charging and power inverter system and apparatus to enable a storage battery readily to be charged from a source of alternating current whenever desired and to convert the battery current into alternating current whenever desired for operation of any desired appliance requiring alternating current for its operation.

The invention has special utility in connection with the charging of the batteries of boats, aircraft, motor vehicles and the like during periods of their idleness by commercial alternating current, and in the employment of the battery current for operating appliances such as radios, electric shavers, fans and the like requiring alternating current for their operation.

A special and important object of the invention is to provide a system and apparatus for the purposes stated which includes a single transformer constituting part of both the battery charging means and the power inverter means.

Another special and important object of the invention is to provide simple, practical means to prevent the system and apparatus from being used to operate an appliance while the battery is being charged and to prevent the battery from being charged while the system and the apparatus are being used to operate an appliance, thus to insure against damage to the system or the apparatus.

Another special and important object of the invention is to provide a system and apparatus for the purposes stated embodying a simple, practical switching arrangement such that it is impossible to wrongly connect either a source of battery charging current or an appliance with the apparatus, whereby the system and the apparatus may safely and reliably be used by persons not having electrical knowledge or skill.

With the foregoing and other objects in view, which will become more fully apparent as the nature of the invention is better understood, the same consists in a combined battery charging and power inverter system and apparatus embodying the novel features of construction, combination arrangement and connection of parts as are illustrated by way of example in the accompanying drawing and as will be hereinafter more fully described and claimed.

In the accompanying drawing, wherein like characters of reference denote corresponding parts in the different views:

Fig. 1 is a perspective view of a device including a compact assemblage of pieces of apparatus constituting part of the system; and Fig. 2 is a diagrammatic view of the system.

Referring to the drawing in detail, it will be observed that the apparatus involved is simple and consists primarily of a transformer A, a suitable current rectifier B, a vibrator C, an ordinary plug receptacle D, a special plug receptacle E, a cooperating special plug F, a switch G, and a suitable support H upon which the elements A to G are mounted.

The support H may consist, for example, simply of a plate bent into U-shape to provide a central panel 10 and end supporting legs 11 therefor, which end legs may have outwardly turned flanges 12 apertured as indicated at 13 to receive screws or other fasteners for securing the support to any desired structure. If the support H is of U-shape, as shown, the transformer A, the current rectifier B and the vibrator C may appropriately be arranged compactly and protectively beneath the panel 10 either in the manner shown or in any other suitable manner and may be fastened to said panel in any suitable manner. Alternatively, said support H may be of any other suitable form and may have the transformer A, the current rectifier B and the vibrator C assembled thereon in any other desired manner. Moreover, the plug receptacles D and E may be mounted on the support H or upon any other suitable support. Preferably, however, they are mounted on the support H so that all of the pieces of apparatus involved in the invention are in unitary assembly with each other. In any event, the said plug receptacles are mounted where they are readily accessible and in closely adjacent side to side relationship to each other so that when an ordinary plug I is plugged into the receptacle D it acts to prevent the special plug F from being plugged into the special plug receptacle E, and when the special plug F is plugged into the special receptacle E it acts to prevent the plug I from being plugged into the receptacle D. In this connection, the special plug F may be provided, if desired, but not necessarily, with a flange 14 to serve as an obstruction against plugging in of the plug I when said special plug is plugged in, and to engage the plug I when the latter is plugged in to prevent plugging in of said special plug, so that it is impossible to plug in both plugs F and I at the same time even though there may necessarily be a certain spaced relationship between the receptacles D and E. Further in this connection, the switch G is of a normally open type and is of suitable construction and is disposed with respect to the plug receptacle D so that it is closed by the plug I when the latter is plugged into the receptacle D.

The special plug receptacle E preferably is of the recessed type and is provided with four contacts 15, 16, 17 and 18 which preferably, but not necessarily, are in the form of prongs. The special plug F is provided with four mating contacts 15', 16', 17' and 18', and these as well as the contacts 15, 16, 17 and 18 either are of different sizes or are irregularly arranged so that the plug F may be plugged into the receptacle E only when said plug has a single definite attitude relative to said receptacle in which the contacts 15 to 18 mate with the contacts 15' to 18', respectively.

The transformer A includes high and low tension windings 19 and 20, respectively; the rectifier B may be of the full wave bridge type, as shown, and the vibrator C includes a winding 21, a reed 22 and a pair of contacts 23 and 24 with which said reed cooperates. A storage battery is indicated as J.

In accordance with the invention, the special receptacle contacts 15 and 16 are connected to the ends, respectively, of the transformer high tension winding 19 by conductors 25 and 26, respectively; the special receptacle contact 17 is connected to an output terminal of the current rectifier B by a conductor 27, and the special receptacle contact 18 is connected to one terminal of the battery J and to the vibrator reed 22 by a conductor 28. The outher side of the battery J is connected by a conductor 29 to the other output terminal of the current rectifier B and by a conductor 30 to one of the contacts 31 of the switch G.

One end of the transformer low tension winding 20 is connected to one input terminal of the current rectifier B by a conductor 32 and to the vibrator contact 23 by a conductor 33. The other end of said low tension winding 20 is connected to the other input terminal of the current rectifier B by a conductor 34; to the vibrator contact 24 by a conductor 35 and to one end of the vibrator winding 21 by a conductor 36. The center tap of the low tension winding 20 is connected by a conductor 37 to the other contact 38 of the switch G. The other end of the vibrator winding 21 is connected to the vibrator reed 22 by a conductor 39.

The contacts of the plug receptacle D are designated as 40 and 41 and these are connected to the ends of the transformer high tension winding 19 by conductors 42 and 43, respectively.

Between the conductors 25 and 26 is interposed a condenser 44 to serve as a buffer against high inductive voltages, while in the conductors 25, 26 and 42 are interposed suitable protective fuses 45.

The contacts 15' and 16' of the special plug F have connected therewith conductors 46 and 47 leading from a source of alternating current, such as commercial 110 volt alternating current. On the other hand, the contacts 17' and 18' of said special plug F are connected together by a conductor 48.

When it is desired to charge the battery J, the special plug F is plugged into the special receptacle E. The alternating current supply source thus is connected with the ends of the transformer high tension winding 19 through the special plug contacts 15', 16', the special plug receptacle contacts 15, 16 and the conductors 25 and 26. Alternating current flowing through the transformer high tension winding 19 induces, of course, low tension alternating current in the transformer low tension winding 20. When the special plug F is plugged into the special plug receptacle E, the connected contacts 17', 18' of said special plug serve to connect the special receptacle contacts 17 and 18 with each other. Thus, the battery J and the current rectifier B are included in circuit with the low tension winding 20 through the conductors 27, 28, 29, 32 and 34, with the result that low voltage, direct current is supplied to the battery for charging the same.

Upon charging of the battery and removal of the special plug F, the current rectifier circuit is opened at the contacts 17 and 18 so that the battery cannot drain through said circuit.

When the plug I of an appliance is plugged into the receptacle D, the normally open switch G is closed and thereby the battery J is included in circuit with the transformer low tension winding 20 and the vibrator C through the conductors 30, 37, 35, 33, 36 and 39. The reed 22 thereupon vibrates and produces a fluctuating direct current in the transformer winding 20 which induces in the winding 19 a high voltage fluctuating current which is supplied through the conductors 42 and 43 to the appliance for operating the same.

Upon removal of the plug I, the switch G opens and thereby opens the vibrator circuit so that there can be no drainage of the battery through this circuit.

From the foregoing description considered in connection with the accompanying drawing, it is believed that the construction and operation of the system and apparatus will be clearly understood and its advantages appreciated. It is desired to point out, however, that while only a single specific embodiment of the invention has been illustrated and described, the same is readily capable of specifically different embodiments within its spirit and scope as defined in the appended claims.

I claim:

1. A battery charging and power inverter system having a single transformer utilized in both a charging circuit for a battery and a power output circuit from the battery, said system comprising in combination, the battery, the transformer having a high tension winding and a low tension winding, a rectifier, a charging circuit for said battery including said low tension winding and said rectifier, a vibrator, a power output circuit from said battery including said low tension winding and said vibrator, means for selectively closing said charging circuit and said power output circuit, and a circuit for said high tension winding adapted to be selectively connected to an alternating current source or an alternating current load.

2. A device including a single transformer for charging a battery and for supplying an alternating current load from the battery, comprising in combination with the transformer having a high tension winding and a low tension widing, a pair of terminals adapted to be connected to a battery, a rectifier, a first normally open circuit for connecting said terminals across said low tension winding and including said rectifier, a vibrator, a second normally open circuit for connecting said terminals across said low tension winding and including said vibrator, means for selectively closing said first and second circuits, and a circuit for said high tension winding having terminals adapted for connection to an alternating current source or an alternating current load, for respectively receiving current for charging purposes and delivering current to the load.

3. In combination, a transformer having two windings, a first circuit for one of said windings, a rectifier, a second circuit for the other of said windings including a normally open connection and said rectifier, a vibrator, a third circuit for the said other winding including a normally open connection and said vibrator, and means for selectively closing said second and third circuits, whereby direct current is supplied in said second circuit when closed and said first circuit is supplied with alternating current, and alternating current is supplied in said first circuit when said third circuit is closed and supplied with direct current.

4. In a power supply means, a transformer, a rectifier, means including said transformer and said rectifier for at times supplying direct current to a load from a source of alternating current, a vibrator, and means including said transformer and said vibrator for at other times supplying alternating current to a load from a source of direct current.

5. In a power supply means, a transformer, means including said transformer for at times supplying direct current to a load from a source of alternating current, and other means including said transformer for at other times supplying alternating current to a load from a source of direct current.

6. In a battery charging and power inverter device, a pair of terminals adapted to be connected to a battery, a transformer having high tension and low tension windings, a rectifier, a first circuit for said terminals including said rectifier and said low tension winding, a vibrator, a second circuit for said terminals including said vibrator and said low tension winding, and a third circuit for said high tension winding, whereby direct current is supplied to said terminals over said first circuit if a source of alternating current is connected to said third circuit and alternating current is supplied to said third circuit if a source of direct current is connected to said terminals.

7. In a battery charging and power inverter device, a pair of terminals adapted to be connected to a battery, a transformer having high tension and low tension windings, a rectifier, a first circuit for said terminals including said rectifier and said low tension winding, a vibrator, a switch, a second circuit for said terminals including said vibrator and said switch and said low tension winding, and a circuit for said high tension winding, whereby direct current is supplied to said terminals over said first circuit if a source of alternating current is connected to the said circuit for said high tension winding and alternating current is supplied to the said circuit for said high tension winding when said switch is closed if direct current is supplied to said terminals.

8. A battery charging and power inverter device according to claim 7 in which a normally open connection is provided in said first circuit between said terminals and said rectifier to prevent backleak through said rectifier, and means is provided for at times closing said connection.

9. In a battery charging and power inverter device, a transformer having a high tension winding and a low tension winding, a first plug receptacle having a pair of terminals connected to said high tension winding, a first plug having terminals adapted to mate with the pair of terminals of said first plug receptacle, a normally open switch associated with said first plug receptacle adapted to be closed by application of said first plug to said first plug receptacle, a second plug receptacle having a first pair of terminals connected to said high tension winding and having a second pair of terminals, a second plug having a first pair of terminals adapted to mate with the first pair of terminals of said second plug receptacle and having a second pair of terminals adapted to mate with the second pair of terminals of said second plug receptacle and interconnected to bridge said second pair of terminals, said first and second plug receptacles and first and second plugs being constructed and arranged so that when either plug is applied to its plug receptacle it prevents the other plug from being applied to the latter's plug receptacle, a pair of terminals adapted to be connected to a battery, a rectifier, a first circuit for said battery terminals including said low tension winding and said rectifier and said second pair of terminals of said second plug receptacle, said second pair of terminals interposed in said first circuit between said battery terminals and said rectifier whereby to prevent backleak of current from said battery terminals though said rectifier when said second plug is removed from said second plug receptacle and to close said first circuit through the bridging of said second terminals for supplying direct current to said battery terminals through said rectifier when said second plug is applied to said second plug receptacle for connecting a source of alternating current to said high tension winding through the mating first pair of terminals of said second plug and plug receptacle, a vibrator, and a second circuit for said battery terminals including said low tension winding and said vibrator and said normally open switch connected between said battery terminals and said vibrator, whereby said normally open switch prevents leakage of current from said battery terminals through said inverter when said first plug is removed from said first plug receptacle and said normally open switch is closed to complete said second circuit when said first plug is applied to said first plug receptacle to take off alternating current from said high tension winding in response to direct current supplied to said battery terminals if a battery is connected thereto.

HENRY D. BISHNER.

REFERENCES CITED

The following references are of record in the file of this patent:

UNITED STATES PATENTS

| Number | Name | Date |
|---|---|---|
| 1,279,392 | Martinetto | Sept. 17, 1918 |
| 1,518,508 | Hart | Dec. 9, 1924 |
| 1,570,499 | Keane | Jan. 19, 1926 |
| 1,787,850 | Wolf | Jan. 6, 1931 |
| 1,795,563 | Klock | Mar. 10, 1931 |